United States Patent Office 3,527,702
Patented Sept. 8, 1970

3,527,702
CARBON DIOXIDE REMOVAL FROM WATER
Josef Holluta, Gunzburg, and Josef Wuhrer, Wulfrath, Germany, assignors to Rheinische Kalksteinwerke G.m.b.H., Wulfrath, Germany
No Drawing. Filed Dec. 5, 1967, Ser. No. 687,994
Claims priority, application Germany, Dec. 10, 1966, R 44,771
Int. Cl. B01d 19/04
U.S. Cl. 210—59
2 Claims

ABSTRACT OF THE DISCLOSURE

Portland cement clinkers or set hydraulic cements are used for water filtration to remove free carbon dioxide.

---

This invention relates to the removal of carbon dioxide from water supply systems.

It is known to filter natural water through granular layers to eliminate the carbonic acid and to form natural anticorrosive coatings in iron pipes and vessels in direct contact with the water. Such filtering materials are marble, calcite, limestone, dolomite, or raw or burnt magnesite. Particularly, the use of partially calcined dolomite for this purpose is known. Thereby, the dolomite is heated only so far as to convert the magnesium carbonate to magnesium oxide while the calcium carbonate remains intact. Finally, deacidification filter beds may be made from products which have been prepared from completely calcined dolomites or from mixtures of calcium oxide or magnesium oxide, or from the corresponding hydroxides, in which the calcium component has been converted to carbonate, e.g. by treatment with carbon dioxide gas or by reaction with sodium or magnesium carbonate under suitable conditions. In this way, also the reactivity of the material is increased.

When the recited filter materials are used, the chemical bonding of the free and corrosive carbon dioxide proceeds according to the following equations:

$$CaCO_3 + CO_2 + H_2O \rightarrow Ca(HCO_3)_2 \qquad (1)$$

$$MgCO_3 + CO_2 + H_2O \rightarrow Mg(HCO_3)_2 \qquad (2)$$

$$MgO + 2CO_2 + H_2O \rightarrow Mg(HCO_3)_2 \qquad (3)$$

As the equations show, 100 g. of calcium carbonate and 84.3 g. of magnesium carbonate each take up 44 g. of $CO_2$ while only 40.3 g. of magnesium oxide take up 88 g. of $CO_2$. Thereby, the water is correspondingly hardened to an extent which, calculated for 10 g. of absorbed carbon dioxide, amounts for reactions (1) and (2) to 1.27, for reaction (3) to only 0.63 German hardness degrees. This would indicate that the most suitable filtering material for the deacidification of corrosive waters would be calcined magnesite.

However, experience has shown that the use of calcined magnesite as filter material for the deacidification of water gives rise to a number of difficulties. The magnesium carbonate produced in the filter by absorption of carbon dioxide is much more soluble than calcium carbonate; it hydrolyzes readily in the water, precipitates difficultly as carbonate, and thereby interferes with the formation of a natural rust preventing layer, in spite of the high pH values. In addition, a steady water contact, particularly in a quiescent system, converts the magnesium oxide grains of the filter to magnesium hydroxide. Even in an originally good water-permeable filter layer, such conversion produces caking, and this interferes eventually with the efficiency and a smooth operation of the filter.

Natural carbonates like marble, raw magnesite or raw dolomite, are little reactive, particularly when their grain surfaces become covered with impurities from the treated water. Therefore, they filter very slowly and produce the desired calcium carbonate equilibrium in the purified water only under special conditions when suitable precautions are taken and clear only little corrosive raw water is used. Neither is a natural corrosion protecting coating in the piping produced because the conditions in the pure water do not fall below the calcium carbonate equilibrium; this prevents a spontaneous deposition of calcium carbonate in the pipes. The normally slow rate of dissolution of the recited filter materials decreases still further as a result of a coating of suspended matter absorbed from the raw water on the surface of the grains; this provides for a relatively short operating time of the filter, small filtering rates, and very large dimensions of the filters and requires very frequent rinsing.

So far, the best filtering results were obtained with half calcined dolomite or with products synthetically produced by carbonation of the calcium oxide portion of fully calcined dolomite, approximately corresponding to the composition of half calcined dolomite. In the last named products, magnesium oxide and calcium carbonate are present in homogeneous very fine distribution, almost like in the half burned dolomite. The grain surfaces are fine-porous and very reactive. This makes it possible to maintain continuously a high filtering rate. Until complete consumption, about 144 g. of this filter material can absorb a total of 132 g. of free carbon dioxide of the raw water (see Equations 1 and 3). Therefore, 100 g. of the product are sufficient to remove about 94 g. of free carbon dioxide from the water.

We have now found that the well known Portland cement clinkers as well as hydraulically set Portland cement are excellent agents for the purification of water and particularly suitable for the removal of corrosive carbon dioxide from drinking and industrial water.

On constant contact with water, the calcium compounds of the cement, particularly the calcium silicates, hydrolyze rather easily from their grain surface. The liberated calcium hydroxide is very active and absorbs very fast the carbon dioxide dissolved in water. With the main component of the Portland cement, the tricalcium silicate, the following reactions take place:

$$(CaO)_3SiO_2 + 3H_2O = 3Ca(OH)_2 + SiO_2 \qquad (4)$$

$$Ca(OH)_2 + 2CO_2 = Ca(HCO_3)_2 \qquad (5)$$

Analogous relations apply to the other hydrolyzable calcium compounds of the Portland cement clinker. Any free calcium oxide or calcium hydroxide acts also as a direct deacidifying agent; it will be present in the clinker product in a small and in the set cement in a larger amount as far as it has not been dissolved during the starting-up period of the filter or has been temporarily precipitated in the filter as very reactive calcium carbonate as a result of softening reactions in relatively hard raw waters.

Instead of Portland cement, similar other cements may be used, of course.

Until complete consumption, 228 g. of tricalcium silicate can absorb 264 g. of free carbon dioxide, with formation of 486 g. of calcium hydrogen carbonate; this corresponds to a hardness increase of 0.64 German hardness degrees for 10 mg. of bound free carbon dioxide from the raw water. Compared therewith, the absorption of the same amount of free carbon dioxide with half calcined dolomite produces generally a hardening increase of 0.85 German hardness degrees, i.e. a 33% higher increase. In addition, 100 g. of clinkers can absorb about 105–115 g. of free carbon dioxide, while the same amount of half burnt dolomite absorbs only 90–94 g.

Our investigations have shown that, during the fast proceeding deacidification, only small amounts of silica dissolve; even in the extreme case of soft water, said amounts do not exceed 2.5–3 mg./liter. This side-reaction is fully desirable because it promotes to an extraordinarily large extent the formation of a rust protecting layer, even in very soft raw waters of low lime content whose hardness is increased to the extent necessary for that purpose by the carbon dioxide absorption alone.

A measurable dissolution of the low iron content of the grains of the clinkers or set Portland cement does not take place under the normal conditions of the water deacidification by filtration; in iron or manganese containing corrosive raw waters, a distinct removal of the iron and/or manganese can be observed whereby said removal does not substantially affect the deacidification.

In the same way as the Portland cement clinker, also the hydraulically set Portland cement can be used for removal of the corrosive carbon dioxide from water. For enlargement of its grain surfaces, said set cement can be made porous.

This can be accomplished e.g. by adding to the cement mortar very small amounts of expanding or foaming agents such as aluminum powder or resin soaps. The thus produced considerably greater boundary surface accelerates very considerably the absorption rate of the free carbon dioxide and provides for an increased filtering rate.

The Portland cement clinkers or the set Portland cement are used as filter beds with advantage in closely classified sizes of about 0.8–1.5 mm., 1.5–3 mm., and 3–4.5 mm. The total range of these sizings can be between 0.3 and 15 mm. preferably between 0.5 and 6 mm.

As Portland cement clinker, we can use material as directly obtained from the cement kiln, screened to the corresponding mesh sizes, or also a granular product obtained from crushed clinker.

The advantages of our novel filter material over the materials used heretofore for the water deacidification by filtration, are primarily economic consumption and the greater efficiency in the removal of the corrosive carbon dioxide from the raw water, even in the presence of small amounts of suspended matter and iron or manganese. The novel material allows either of increasing the filter output with the same amount by weight of the same grain size, or of reducing the amount of filter material for the same output, which makes it possible to use a smaller deacidification plant.

It is possible to modify or further improve the properties of the novel filter materials by incorporating suitable additives. Such additives are e.g. the known filtering agents such as calcium carbonate, magnesium carbonate, dolomite, magnesium oxide, magnesium hydroxide, calcium hydroxide, partially calcined dolomite, and the like. Other additives are those which are capable of absorbing physical impurities of the water, e.g., traces of oil or odors. Suitable additives for this purpose are carbon black, active carbon, silica, Fuller's earth, active alumina, etc.

For the removal of salts or ions from the water cation and/or anion exchange resins may be added. They may be weakly or strongly acid or basic, and it does no harm when the cation exchangers are charged temporarily with alkaline earth ions from the cement or the alkaline earth additives. During the use of the filtering agent, such charge produces a buffer effect. The ion exchangers can also be used in the charged state.

It may also be of advantage to assist the removal of iron and manganese by incorporating in the filter material oxides or hydroxides of cobalt, manganese, and/or copper.

Bactericidal effects of the filter material can be obtained by incorporating metallic silver in very fine distribution, or silver compounds which, in the presence of halogens, form difficultly soluble halides, or which form oxides in an alkaline medium, so as not to present the risk of being leached out.

The additives can be incorporated simply or in combination but the amounts should not be as large as to affect the abrasive strengths of the filter grains. Generally, it is possible to incorporate up to 80 percent by weight of additives into the cement. The amount must be lower for voluminous compounds such as calcium or magnesium hydroxide or precipitated carbonates.

The incorporation of the additives is very simple. It is only necessary to mix the cement therewith with addition of water; the mix is then granulated or pressed to tablets, or cast to form filter candles, plates or the like. The formed mixes are then allowed to set. Soluble salts can be added to the cement mix or the set cement can be impregnated therewith afterwards.

The following examples are given to illustrate the invention.

EXAMPLES

The tests were carried out in Plexiglass filters of 2 m. height and 50 mm. inner diameter. The following filter materials were used:

(a) Partially calcined dolomite (weight per liter 1185 g.) containing 64.1% of calcium carbonate, 20% of magnesium oxide, 11.55% of magnesium carbonate, and 1% of free calcium oxide;

(b) Screened Portland cement clinker (weight per liter 1420 g.) containing 68% of calcium oxide, 23.8% of silica, and 5.6% of iron-aluminum oxides ($R_2O_3$);

(c) Portland cement, hydraulically set and made artificially porous (weight per liter in the set state 1020 g.) containing 54.9% of calcium oxide, 19.0% of silica, and 6.6% of iron-aluminum oxides.

The filter tubes had a bottom of copper wire net; on this filter bottom, there was placed first a gravel layer (grain size 1 mm.) to a level of 5 cm. and then 2.5 kg. of the filter material in a grain size of 1.2–1.5 mm. Three different waters of the following compositions were used for the tests.

| Test series No. | Carbonate hardness °d. | free $CO_2$ (mg./liter) | CaO (mg./liter) | MgO (mg./liter) | Ion strength |
|---|---|---|---|---|---|
| I | 3.7 | 14.1 | 200.1 | 33.8 | 15.8 |
| II | 4.7 | 28.6 | 100.9 | 8.6 | 6.0 |
| III | 11.2 | 56.6 | 149.0 | 25.4 | 12.0 |

Prior to each test series, the filters had been used for at least 10 days where the composition of the purified water was continuously controlled and where the filtering rate was varied and adjusted by controlling the discharge rate of the filtered water so as to produce a purified water in which lime and carbon dioxide were in equilibrium. The used raw waters were "lime-aggressive" to different degrees. The test temperature was between 18 and 20° C. The equilibrium condition of the filtered water was continuously controlled by the measurement of the pH.

In order to obtain comparative values, the amounts of filter material in kg. per 1 m.³/h. of water passage for obtaining equilibrium were calculated from the test results and from the measurements which were carried out during the start-up period at different filtering rates. The following values were obtained.

| | Kg. of filter grains at passage of 1 m.³/h. of water to produce equilibrium | | |
|---|---|---|---|
| Test Series | Half calcined dolomite | Portland cement clinker | Portland cement set |
| I | 76 | 35 | 30 |
| II | 66 | 52 | 57 |
| III | 87 | 78 | 121 |

It will be seen that the water purifying agent on the basis of Portland cement offers considerable advantages for the deacidification. An exception is the set Portland cement only at high water hardness; under such conditions it may require greater quantities but still it offers other advantages as shown by the following tests. These tests were carried out in a similar manner as the preceding series so as to determine by exact analysis of the purified water the hardness increase which corresponds, under otherwise the same filter conditions, to an absorption of 10 mg./liter of free carbon dioxide. The tests were carried out with a hard raw water (carbonate hardness 14.2° d.) containing a high content of free carbon dioxide, i.e. under extremely unfavorable conditions.

The following values were obtained for the increase of the carbonate hardness in the filtered water:

|  | German hardness [1] |
|---|---|
| Half calcined dolomite | 0.77 |
| Portland cement clinker | 0.69 |
| Portland cement set | 0.60 |

[1] Degrees per 10 mg./liter of absorbed $CO_2$.

In these tests, the following quantities of free carbon dioxide per liter of raw water were absorbed per kg. of filter mass:

|  | Mg./l. $CO_2$ |
|---|---|
| Half calcined dolomite | 18.5 |
| Portland cement clinker | 28 |
| Portland cement set | 26 |

The tests show that the use of the novel filter material results in a considerable saving of such material and provides a material which can be longer employed than the previously used materials.

The term German hardness degrees is defined as: 1 German hardness degree = 10 mg. CaO in 1 liter of water. Thereby the calcium salts which are dissolved in water are calculated as CaO.

We claim:
1. A method of removing carbon dioxide from water comprising contacting said water with a material selected from the group consisting of Portland cement clinker and hydraulically set cement, said cement clinker and cement consisting essentially of calcium oxide, silica and iron-aluminum oxides.
2. The method as claimed in claim 1 wherein said material has a grain size in the range of 0.2 to 15 mm.

References Cited

UNITED STATES PATENTS

| 260,546 | 7/1882 | De Smedt | 23—66 X |
| 1,997,114 | 4/1935 | Martin | 210—53 |
| 3,232,868 | 2/1966 | Flachsenberg et al. | 210—59 |

FOREIGN PATENTS

| 267,971 | 3/1927 | Great Britain. |

OTHER REFERENCES

Manual on industrial water and industrial waste water, ASTM Special Technical Publication No. 148–D, second edit., 1959, published by ASTM, Philadelphia, Pa., pp. 72–74.

MICHAEL E. ROGERS, Primary Examiner

U.S. Cl. X.R.

23—66; 55—68; 252—175